March 24, 1959   P. E. GRANDMONT ET AL   2,879,486
SYSTEM FOR RESHAPING VOLTAGE WAVEFORMS
Filed April 14, 1955                                   3 Sheets-Sheet 1

*INVENTORS*
PAUL E. GRANDMONT
RICHARD K. CHENG
ROBERT Y. HUANG
By Orin R. Severn
their ATTORNEY March 24, 1959     P. E. GRANDMONT ET AL     2,879,486
SYSTEM FOR RESHAPING VOLTAGE WAVEFORMS
Filed April 14, 1955                          3 Sheets—Sheet 3

INVENTORS
PAUL E. GRANDMONT
RICHARD K. CHENG
BY ROBERT Y. HUANG

*their* ATTORNEY

United States Patent Office 2,879,486
Patented Mar. 24, 1959

2,879,486

SYSTEM FOR RESHAPING VOLTAGE WAVEFORMS

Paul E. Grandmont, Bloomfield, and Robert Y. Huang, Union City, N.J., and Richard K. Cheng, West Lafayette, Ind., assignors to Curtiss-Wright Corporation, a corporation of Delaware Application April 14, 1955, Serial No. 501,362

9 Claims. (Cl. 333—20)

Our invention relates to a voltage control system which is particularly adapted to modify the waveform of an alternating voltage in a desired manner.

The invention is useful for eliminating from (or adding to) a given voltage waveform various harmonic-frequency components so as to provide an output voltage of any desired waveform. It has particular application in eliminating harmonics (or other higher frequency noise) from commercial A.C. supply lines of 60 c.p.s. or other frequencies. By eliminating harmonics from an A.C. line, a pure sine wave may be obtained which is highly desirable for many testing, measuring and computing circuits.

It is impractical to eliminate such harmonics from an A.C. supply by conventional inductance-capacitance filters without producing appreciable amplitude changes and phase shifts between supply and filter output when output load is varied, and also appreciable power loss in the filter elements under load.

It is an object of our invention to provide apparatus adapted to modify a given voltage waveform in a desired manner without producing changes in phase or fundamental-frequency amplitude even when load on the apparatus is varied.

It is another object of our invention to provide apparatus of the described type for eliminating harmonics from a commercially supplied alternating voltage by producing a voltage representing the harmonics therein and utilizing such voltage reversed in phase to cancel the undesirable harmonics.

The invention will be more fully set forth in the following description referring to the accompanying drawings, and the features of novelty will be pointed out with particularity in the claims annexed to and forming a part of this specification.

Figure 1:
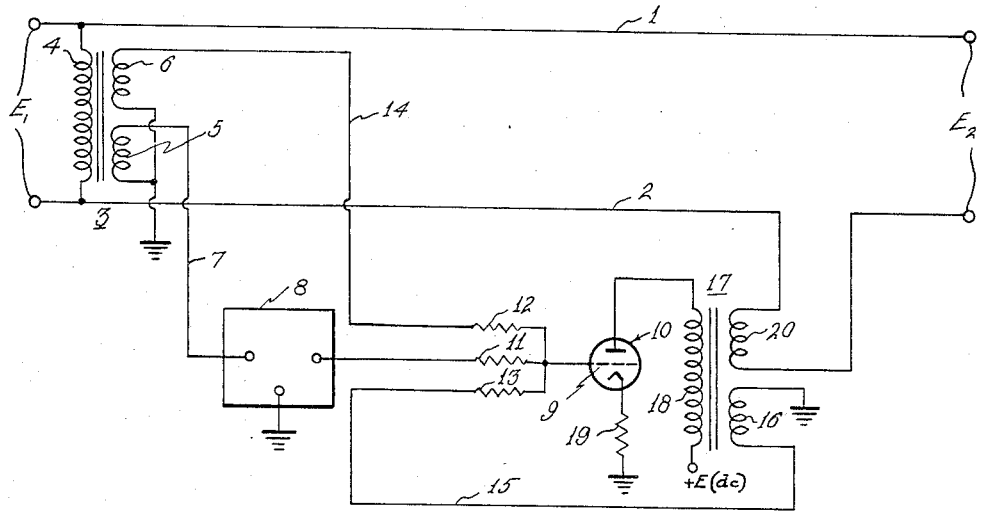
Figure 2:
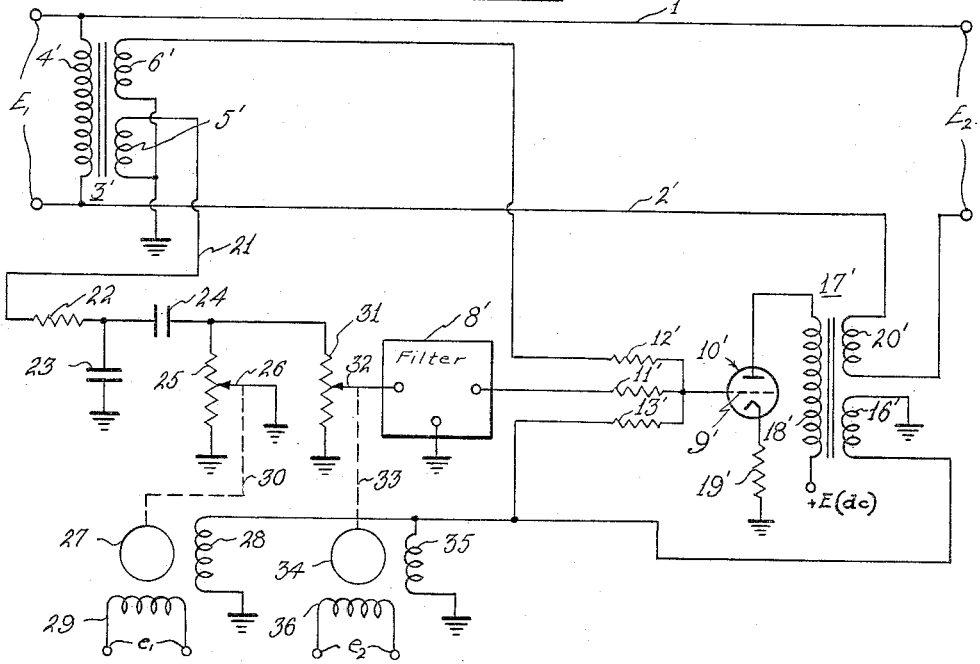
Figure 3:
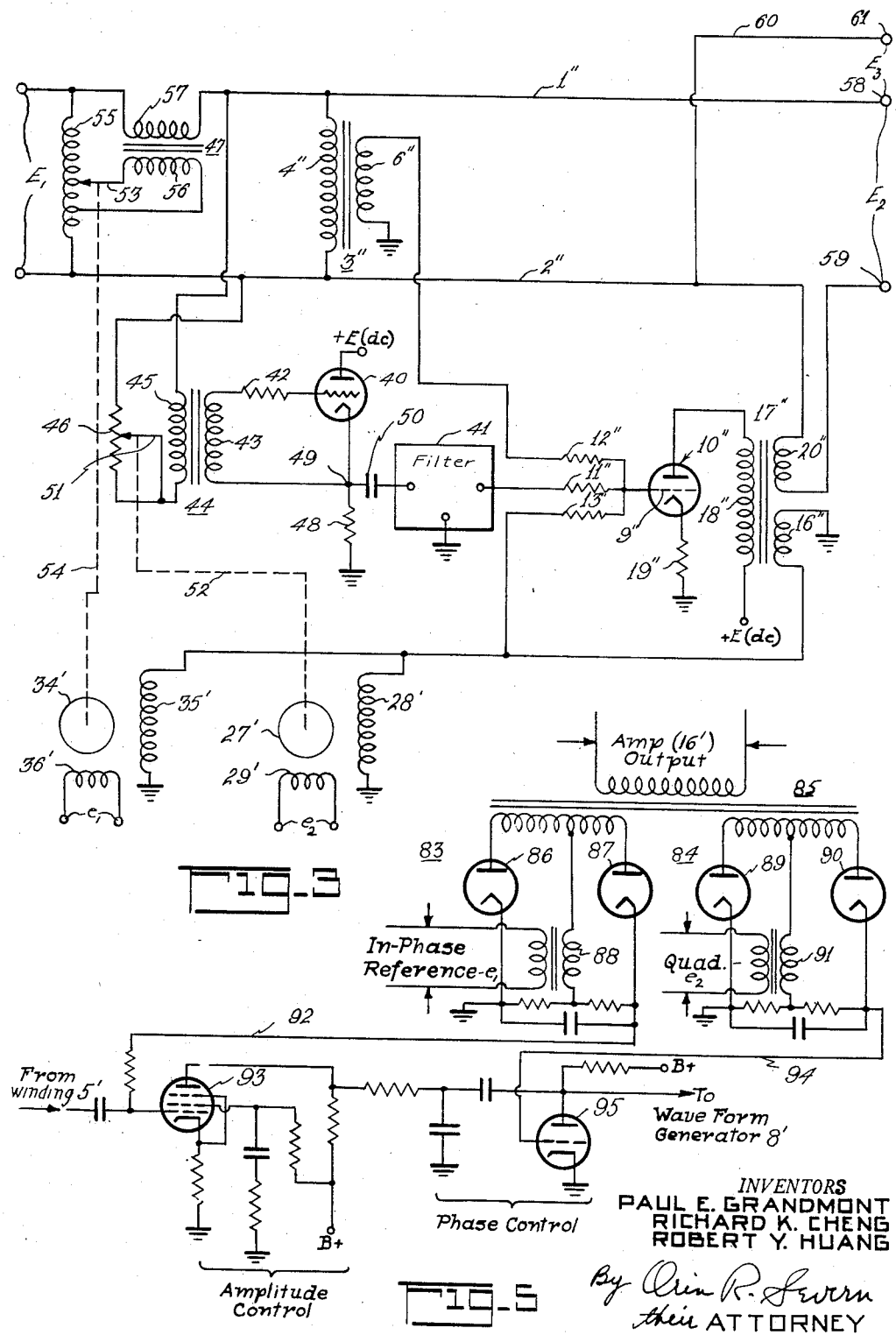
Figure 4:
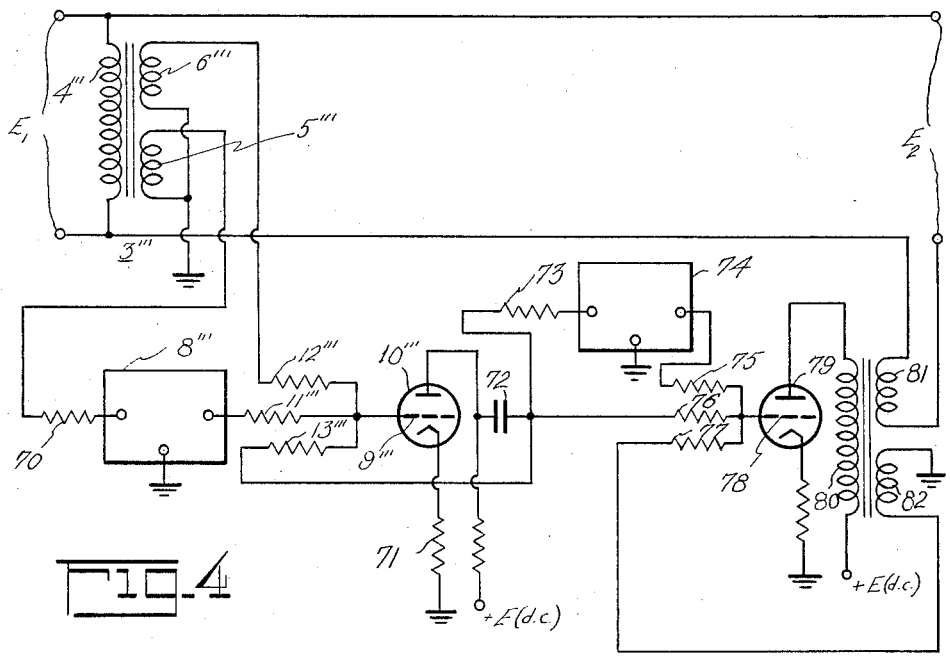
Figure 6:
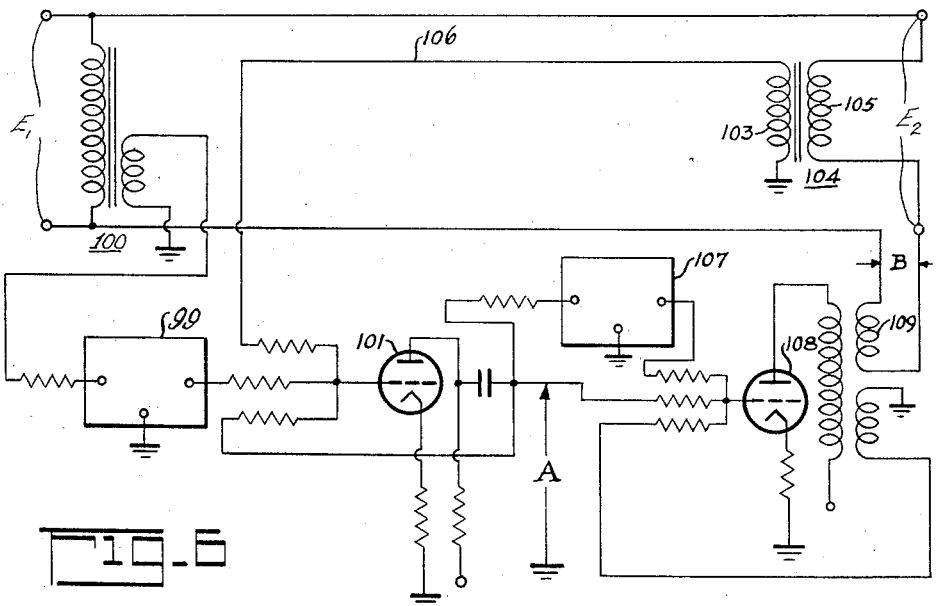

Referring to the drawings, Fig. 1 is a diagrammatic illustration showing waveform-shaping circuitry embodying features of this invention; Fig. 2 is a diagrammatic illustration showing circuitry similar to Fig. 1, particularly adapted for preventing the transfer of fundamental voltage through the apparatus; Fig. 3 is a diagrammatic illustration showing circuitry embodying features of the invention adapted to provide an output voltage having an amplitude which is mechanically regulated in addition to a harmonic-free mechanically and electronically regulated output voltage; Fig. 4 is a diagrammatic illustration of a modified form of the apparatus of Fig. 2; Fig. 5 is a diagrammatic illustration of an essentially electronic version of the system of Fig. 2; and Fig. 6 is a diagrammatic illustration of another form of wave shaping circuitry the invention may assume.

Referring to Fig. 1 of the drawings, reference character $E_1$ designates a supply voltage of given fundamental waveform across the lines 1 and 2. This supply voltage may have permanent or transient variations, harmonics, etc. Our apparatus for modifying the voltage $E_1$ to provide an output voltage $E_2$ having a desired waveform includes the transformer 3 having the primary winding 4 extending across the lines 1 and 2 and the secondary windings 5 and 6 coupled thereto. A sample voltage is obtained across the winding 5 and fed over line 7 to waveform generator 8, the winding being so arranged that the voltage in line 7 is reversed in phase from the supply voltage $E_1$. The waveform generator 8 functions to provide a voltage having a waveform corresponding to the waveform into which it is desired to modify the supply voltage $E_1$. Generator 8 may be constructed in any suitable manner and may for example take the form of a low-pass filter (Fig. 3) or a keyer and filter means (Fig. 4).

The output of generator 8 is fed to the grid 9 of triode 10 over resistor 11 in the summing network which also includes the resistors 12 and 13. As shown, resistor 12 connects over line 14 with the secondary winding 6 of transformer 3, and the resistor 12 connects over line 15 with the secondary winding 16 of the transformer 17 having its primary winding 18 in the plate circuit of triode 10. The grid of tube 10 is provided with a signal over resistor 12 representing the supply voltage and with a feedback signal over resistor 13. The winding 6 is arranged to provide a signal over resistor 12 which is in phase opposition to the voltage applied to resistor 11. The plate circuit of the tube including winding 18 and resistor 19 is energized by the D.C. voltage $+E(D.C.)$ to provide an amplified signal in the winding 18 having a waveform determined in accordance with the input to the grid 9. The resistors 11, 12 and 13 of the summing network which connects with the grid 9 are proportioned to provide an output voltage in the secondary winding 20 of the transformer 17 representing the summation of the signals fed to the grid of the tube 10 over resistors 11 and 12 respectively. The signal to the grid of the tube over resistor 12 represents the supply voltage and is in phase therewith whereas the signal over the resistor 11 represents the desired voltage waveform but is reversed in phase from the supply voltage. Since the voltages feeding the resistors 11 and 12 are opposite in sign the summation of these voltages represents the undesirable frequency components in the supply voltage. An amplified signal having the waveform of such undesirable frequency components and reversed in phase by reason of the triode 10 energizes the transformer 17 to provide an output voltage across secondary winding 20 which is impressed upon the line 2 and is effective to cancel the undesirable frequency components in the supply voltage $E_1$ to provide a resulting output voltage $E_2$ having the desired waveform. It will be appreciated that the amplifying circuitry including tube 10 is shown in the simplest form and that somewhat more elaborate circuitry may be desired. In particular, it may be desirable for example to increase the number of amplification stages depending upon the power and sensitivity requirements.

Referring to Fig. 2 of the drawings, the apparatus shown therein is similar to that shown in Fig. 1, however, the waveform generator is specified as a filter which may be constructed according to well-known principles of suitable inductances and capacitances as required to eliminate undesirable frequency components, as for example harmonics from the supply voltage $E_1$. Suitable phase and amplitude control means are also provided in the form of the apparatus shown in Fig. 2 for preventing any fundamental voltage from being transferred through the amplifying portion of apparatus to the output. Since it is generally difficult to tighten gain and phase tolerances sufficiently to entirely eliminate fundamental voltage, means for continuously correcting for any residual fundamental voltage which might otherwise pass through the amplifying portion of apparatus is provided.

In the apparatus shown in Fig. 2 wherein parts corresponding to those shown in Fig. 1 are designated by like reference characters with a prime mark (') added thereto, the voltage across winding 5' feeds filter 8' through phase and an amplitude control means. Assuming the apparatus is designed to provide a smooth sine wave voltage output $E_2$, the filter 8' functions to eliminate harmonics from a sample of the voltage $E_1$ to provide an input signal to the grid of tube 10' having the desired waveform for the output voltage $E_2$. Winding 5' is so arranged that such input signal is reversed in phase from the supply voltage $E_1$. This signal is summed with a signal representing the supply voltage $E_1$ and in phase therewith to provide a resultant signal which is amplified in the plate circuit of tube 10', and impressed by winding 20' in line 2 as described in connection with the description of Fig. 1. The harmonics in the supply voltage $E_1$ are eliminated by means of the impressed voltage and a smooth sine wave output voltage $E_2$ provided.

Secondary winding 5' of transformer 3' connects over line 21 with the phase control means which includes the resistor 22, condensers 23 and 24, the variable resistor 25 with slider contact 26, and the motor 27 by means of which the effective value of the resistor 25 is controlled. Motor 27 is a two-phase induction motor which includes the windings 28 and 29. Winding 28 is energized by secondary winding 16' of the transformer 17' and winding 29 is energized by an A.C. voltage $e_1$ in phase with the supply voltage, so that in the event fundamental voltage having a component 90° or 270° out-of-phase with the supply voltage $E_1$ is transferred through the apparatus to coil 16' and thence to winding 28, the quadrature component of the out-of-phase voltage across winding 28 causes the motor to turn and position slider contact 26 through connection 30 so as to eliminate such out-of-phase component.

The amplitude control means includes resistor 31 with its slider contact 32 which is actuated through connection 33 by the two-phase induction motor 34. The induction motor 34 has one winding 35 which is energized by fundamental voltage across the coil 16' of the transformer 17' whenever fundamental is transferred through the apparatus, and another winding 36 which is energized by the A.C. voltage $e_2$ 90° out of phase with the supply voltage. Since the out-of-phase component of fundamental is eliminated by the phase control means described only the component of the fundamental in-phase or phase opposition remains to be eliminated. Such residual fundamental appearing across winding 16' causes the motor 34 to be actuated by reason of the quadrature relation of its windings and of the voltages impressed thereacross such that the slider contact 32 is positioned on resistor 31 so as to eliminate the in-phase fundamental. Thus the output voltage across winding 20' consists only of the requisite voltage waveform required to cancel harmonics in the supply voltage, and is free of any fundamental frequency thereby providing for a low power requirement for the amplifier. It should be recognized that the induction motors are responsive to fundamental voltage only and that their inertias are such that they do not respond to harmonics in the winding 16' of transformer 17'.

The apparatus of Fig. 3 is generally similar to that shown in Fig. 2 and corresponding parts are provided with like reference characters except that a prime mark (') has been added. Keyer and filter means are however used in this apparatus for providing a voltage representing desired output voltages $E_2$. Further, the apparatus is particularly adapted to provide both an output voltage having an amplitude which is mechanically regulated in addition to a mechanically and electronically regulated harmonic-free voltage. Assuming the apparatus is adapted for the elimination of harmonics from a supply voltage the keyer and filter means are designed to provide a voltage representing the fundamental of the supply voltage. Such keyer and filter means include keyer tube 40 and the filter 41. The plate of the tube 40 is connected to a D.C. voltage source $+E(D.C.)$ and the grid is connected through a resistor 42 with the secondary winding 43 of transformer 44 which has its primary winding 45 connected across lines 1 and 2 in series with the adjustable resistor 46. A voltage is impressed upon the grid of tube 40 as the coil 45 is energized by the voltage across lines 1 and 2 and such grid voltage provides a current in the plate circuit of tube 40 including the resistor 48 which current results in a voltage at junction 49 of square waveform having a frequency corresponding to the frequency of the supply voltage $E_1$ and in synchronism therewith. The secondary winding 43 is arranged so that the voltage at 49 is reversed in phase from the supply voltage $E_1$. This voltage of square waveform is super-imposed on a D.C. voltage by reason of the conduction of D.C. current through the plate circuit. The D.C. voltage is however eliminated by means of the condenser 50 and the resulting A.C. square voltage waveform is filtered by means of filter network 41 to provide a voltage of sine waveform. Accordingly the output voltage of filter 41 represents the desired waveform for the voltage $E_2$ as reversed in phase from the supply voltage. Because of the constancy of the plate circuit supply voltage $+E(D.C.)$, the output voltage of filter 41 is of constant amplitude and serves as a reference voltage by means of which the amplitudes of output voltages are maintained constant. This voltage is summed in the summing network including the resistors 11", 12" and 13" with the voltage representing the supply voltage induced in the secondary winding 6" of transformer 3" having primary winding 4" connected across the lines 1 and 2. The secondary winding 6" is arranged to provide a voltage in phase with the supply voltage. The output of the summing network is reversed in phase and amplified in the plate circuit of tube 10". A voltage representing harmonics in the supply voltage but reversed in phase from such harmonics is induced in secondary winding 20" of transformer 17" and impressed on line 2 to eliminate the harmonics in the supply voltage. The output voltage $E_2$ in addition to being free of harmonics is also mechanically and electronically regulated in amplitude by the transformers 47 and 17" in a manner which will become apparent hereinafter.

Phase control of the fundamental is accomplished by the operation of induction motor 27' which actuates the slider contact 51 through connection 52. Motor 27' includes winding 28', which connects with the secondary winding 16" of transformer 17", and the winding 29' which is energized by an A.C. voltage $e_1$ in phase with the supply voltage $E_1$. In the absence of any undesirable phase shift the voltage across the winding 28' and the voltage across the winding 29' are in phase and motor 27' is at a standstill. If an undesirable phase shift occurs as for example in the filter 41 the phase shift is reflected in the winding 16" and the winding 28' of the motor whereupon the motor is caused to turn by reason of the quadrature component of the out-of-phase voltage and position slider contact 51 through connection 52 to eliminate such out-of-phase component.

Amplitude control is accomplished by means of the transformer 47 and the induction motor 34' connecting with slider contact 53 which is positioned through connection 54 by the motor on the autotransformer 55 connected across terminals 1 and 2. One of the windings 35' of the motor is energized by the voltage induced at the coil 16", and the other winding 36' is energized by an A.C. voltage $e_2$ 90° out of phase with the supply voltage so that the motor 34' is caused to operate whenever secondary winding 16" is energized by in-phase fundamental votlage transferred through the apparatus. The motor is caused to position the slider contact 53 such that the voltage across lines 1" and 2" to the right of the autotransformer as shown in the drawing is adjusted to effect elimination of the in-phase fundamental. This is effected when the voltage induced in secondary winding 6″ is such that the signal input to tube 10″ over 12″ corresponds with the signal input over resistor 11″.

By maintaining the signal over resistor 12″ equal to the signal over resistor 11″ (neglecting harmonics) the voltage to the right of the auto-transformer is maintained constant according to reference voltage generated by the keyer and filter means and feeding tube 10″ over resistor 11″. Accordingly an output voltage $E_2$ of constant amplitude and free of harmonics is provided across terminals 58 and 59. A lead 60 connected to line 2 provides a second output voltage $E_3$ of constant amplitude across terminals 58 and 61.

It should be noted that by reason of the essentially instantaneous action of coil 20″ of the transformer 17″, the voltage $E_2$ is continuously and instantaneously regulated primarily independently of the action of the mechanical regulating system 34′, etc. provided of course that the corrections required do not exceed the maximum output voltage limitations of tube 10″. This mechanical system for variations within its response range will act to substitute for the fundamental in-phase voltage across 20″ an equal voltage across 57 and therefore regulate the voltage $E_3$ mechanically.

It should be understood that the apparatus shown in Figs. 1, 2 and 3 may be varied many ways within the scope of the invention. The apparatus of Fig. 2 may for example be modified as shown in Fig. 4 to eliminate the necessity of providing servo motors for phase and amplitude control of residual fundamental voltage, and yet provide a purely harmonic output voltage, substantially devoid of any residual fundamental voltage. In place of the servo motors, filter means are provided between amplification stages in the apparatus to effect the cancellation of residual fundamental voltage. Referring to Fig. 4 wherein the reference characters correspond to the reference characters on similar parts in Fig. 2 except for the addition of the double prime mark (″′), a voltage reversed in phase from the voltage $E_1$ is induced across secondary winding 5″′ of transformer 3″′ and fed to the filter 8″′ through resistor 70. The filter 8″′ removes harmonics from the input signal to provide a harmonic-free output which is fed to the grid of tube 10″′ over resistor 11″′ in the summing network including resistors 12″′ and 13″′. A voltage is induced in the winding 6″′ representing the input signal $E_1$ and in phase therewith. Such voltage feeds the grid 9″′ of tube 10″′ over the resistor 12″′. The summing network sums the input signals to tube 10″′ over resistors 13″′, 11″′ and 12″′ and provides an amplified output signal in the plate circuit including the resistor 71 representing harmonics in the supply voltage $E_1$ but reversed in phase therefrom. This signal is superimposed upon a D.C. signal by reason of the D.C. voltage +E(D.C.) which energizes the plate circuit of the tube. The D.C. signal is removed by the condenser 72 leaving a signal representing as reversed in phase, the harmonics in the input voltage. Such signal representing the harmonics is fed over the resistor 73 to filter 74 which connects over resistor 75 in the summing network including resistors 76 and 77 to the grid 78 of triode 79. Assuming the presence of residual fundamental voltage in the signal to the filter 74, filter 74 isolates the fundamental voltage by removing the harmonics therefrom to provide an output signal over the resistor 75 representing residual fundamental voltage. The filter is designed to effect a phase reversal in such fundamental voltage. The signal over resistor 76 represents harmonics in the supply voltage $E_1$ as reversed in phase plus the residual fundamental voltage. The residual fundamental voltage is therefore cancelled in the summing network since the fundamental signals over resistors 75 and 76 are of opposite phase. The voltage across the primary winding 80 in the plate circuit of tube 79 induces a voltage in secondary winding 81 representing only the harmonics in the input signal $E_1$. This voltage is of the same phase as the harmonics in the supply voltage $E_1$ and is reversed by suitably arranging winding 81. The signal as reversed in phase is impressed in line 2″′ to cancel harmonics in the supply voltage $E_1$ and provide a harmonic-free output voltage. As indicated secondary winding 82 provides a feedback signal to the grid of tube 79 over resistor 77.

If desired, suitable electronic means known in the art may be used in place of the servo motor and amplitude correction means of Fig. 2 to perform the functions of filter phase and attenuation error correction. An example of such electronic means is shown in Fig. 5 (to be considered with Fig. 2) wherein a pair of phase sensitive de-modulator circuits generally indicated at 83 and 84 substitute for the servo motors 34 and 27 respectively. The de-modulator circuits which may be of conventional design as shown are energized by a transformer 85 which in turn connects with and is energized by the secondary winding 16′ (Fig. 2). One of the de-modulating circuits 83 includes the diode rectifying tubes 86 and 87 and the coil 88 which is energized by an A.C. voltage in-phase with the input voltage $E_1$, whereas the other de-modulating circuit 84 includes the diode rectifying tubes 89 and 90 and the coil 91 which is energized by an A.C. voltage 90° out-of-phase with the input voltage $E_1$. As indicated the de-modulating circuit 83 connects over line 92 with the grid of tube 93 which serves the same function as the potentiometer 31 of Fig. 2. The grid of tube 93 also connects with the winding 5′ of transformer 3′ (Fig. 2). The other de-modulating circuit 84 connects over line 94 with the grid of tube 95 which functions as a variable resistance in place of the resistor 25 of Fig. 2.

Assuming fundamental voltage to appear across the winding 16′ (Fig. 2) of arbitrary phase with respect to the input voltage $E_1$, the de-modulating circuit including the coil 88 energized by the in-phase voltage $e_1$ produces a D.C. output voltage in line 92 of magnitude proportional to the in-phase component of the fundamental voltage in the winding 16′ effective to vary the bias and gain of tube 93 so as to adjust the amplitude of its output signal which is fed to the filter 8′ such that the fundamental in-phase component is reduced. The de-modulator circuit has no output due to amplifier voltage in quadrature with the input voltage $E_1$, and practically none due to harmonic voltages in the amplifier output. In any event, harmonic components may if desired, be filtered by suitable filter network between the amplifier output and the primary of transformer 85. The de-modulator circuit including the coil 91 energized by the quadrature A.C. voltage has an output which varies the bias and plate resistance of tube 95 such that the phase of the voltage to the filter 8′ is shifted so as greatly to reduce the quadrature fundamental at the amplifier output in winding 16′.

The arrangements for waveform reshaping shown in Figs. 1 to 4 are all of the form generally referred to as "open-loop" and "calibrated." That is, the reference waveform is compared to the input voltage and the difference fed to a buffer amplifier the gain of which must be held at an exact value in order that its output combine in series with the input to give the desired output waveform. It thus depends on the amplifier gain being stable at the correct value for proper operation, and no means are provided to compensate for incorrect gain.

Since use of standard feedback techniques provides the desired stability of amplifier gain, this presents no problem. However, a "closed-loop" or "feedback" arrangement is possible which minimizes the effect of amplifier gain, provided only that this gain be of high value.

In this arrangement the reference waveform is compared, not with the input, but with the output waveform. Since this latter, when corrected, is very nearly of same waveform as the reference standard, the undesired components in the difference voltage obtained will be very small. These components are amplified in the same fashion as before; however a very high gain is provided so that the amplifier output is nearly equal in magnitude to the undesired components in the input.

This arrangement will function to produce an output in which the components of the input which differ from the reference are reduced by a factor very nearly equal to the gain of the amplifier.

In Fig. 6 the scheme of Fig. 4 is shown modified to this "feedback" form. Except for the indicated modifications the circuitry of Fig. 6 is seen to be generally similar to that shown in Fig. 4. A filter 99 is provided to remove harmonics from the input signal fed from transformer 100 to provide a harmonic-free output voltage representing the desired waveform. This voltage is fed to the grid of tube 101 for combining with a signal representing the output signal $E_2$. This signal is derived at the secondary winding 103 of transformer 104 having its primary 105 connected in this case across the output terminals of the apparatus. As indicated, the secondary winding 103 connects over the line 106 with the grid of tube 101 through a resistor in the usual summing network for summing input signals. The winding 103 is so arranged that the signal induced therein is in phase with the output voltage $E_2$. A filter 107 is provided for purposes already explained in connection with Fig. 4, such filter being effective in the elimination of residual fundamental voltage. Suitable amplifying means including the triode 108 provide an effective voltage in the secondary winding 109 for cancelling harmonics in the input voltage $E_1$. In this form of the invention the amplifier is designed to provide very high gain between A and B, such high gain being necessary for the reasons already pointed out.

Accordingly, the invention is not limited to specific details of construction and arrangement thereof herein illustrated, and changes and modifications may occur to one skilled in the art without departing from the spirit of the invention.

What is claimed is:

1. Apparatus for producing a line output alternating voltage of an ultimately desired waveform from a line input voltage of the same fundamental frequency having a different waveform, comprising means for producing a reference voltage having a waveform of substantially purely fundamental frequency of said input voltage, means for comparing said reference voltage and a voltage having a waveform substantially the same as one of said line voltages, the output of said comparing means representing a difference voltage containing principally harmonics of said fundamental voltage, means for removing from said difference voltage any residual fundamental voltage to produce a purely harmonic difference voltage, and means for combining said purely harmonic difference voltage and said input voltage so as substantially to cancel the harmonics in said output voltage whereby said output voltage is of said ultimately desired waveform.

2. Apparatus for removing harmonics from an alternating input voltage comprising means for providing a voltage proportional to said input voltage, filter means for removing harmonics from said proportional voltage to provide a voltage having substantially purely the fundamental form of said input voltage, means for combining said voltage proportional to said input voltage with said fundamental voltage to produce a voltage representing harmonics in the input voltage, means for substantially cancelling the harmonics in the input voltage with said voltage representing harmonics, and means controlled by residual fundamental voltage in said voltage representing harmonics for substantially eliminating said residual fundamental voltage from said voltage representing harmonics.

3. Apparatus for reshaping an alternating input line voltage waveform to a desired output line voltage waveform comprising means for producing a voltage having a waveform substantially the same as one of said line voltages, adjustable phase-shift and attenuation circuitry energized according to said input voltage, waveform generating means controlled by said circuitry, for producing a substantially purely fundamental voltage waveform of said input voltage, means for comparing said voltage having a waveform substantially the same as one of said line voltages with said fundamental voltage for producing a difference harmonics voltage, means for combining said difference harmonics voltage with said input voltage thereby substantially to eliminate all harmonics in said line output voltage and to produce for said output voltage the desired waveform, and means controlled in accordance with residual fundamental components in said difference harmonics voltage for selectively adjusting said phase-shift and attenuation circuitry so as to correct any phase-shift of said compared fundamental voltage with respect to the input voltage and to correct the amplitude of said compared fundamental voltage with respect to said input voltage whereby substantially no fundamental voltage appears in said difference harmonics voltage.

4. Apparatus as defined in claim 3 wherein the adjusting means comprises a first servo motor operable according to in-phase and phase opposition components of the aforesaid fundamental frequency in the difference harmonics voltage, and a second servo motor operable according to 90° and 270° out-of-phase components of the aforesaid fundamental frequency in the difference harmonics voltage to adjust the attenuation and phase shift circuitry for amplitude correction and phase-shift correction respectively.

5. Apparatus as defined in claim 3, wherein the phase shift and attenuation adjusting means comprises a pair of phase-sensitive rectifying circuits responsive respectively to in phase and phase opposition fundamental components, and to 90° and 270° out of phase fundamental components in said harmonics difference voltage, and connected respectively to the phase shifting and attenuation circuitry so as substantially to eliminate all components of the fundamental in said harmonics difference voltage.

6. Apparatus for shaping and regulating an unregulated alternating input line voltage waveform to a desired output line voltage waveform comprising means, including adjustable amplitude control means, for regulating said input voltage and producing an intermediate line voltage, means for producing a first voltage representing said intermediate voltage, a waveform generator having a phase control for producing at the fundamental input frequency a reference voltage of constant amplitude, means for comparing said first voltage and said reference voltage to produce an error voltage including difference harmonics and residual fundamental components, means for combining said error voltage with said intermediate voltage for substantially cancelling harmonics in said output voltage with said difference harmonics thereby to produce the desired waveform at the line output, and for simultaneously instantly substantially cancelling in said output voltage deviations from the regulated value with said residual fundamental components, and first and second means controlled in accordance with said residual fundamental components, said first means for adjusting the aforesaid amplitude control means thereby substantially to eliminate from said error voltage such of the said residual fundamental components as are in phase and phase opposition to said first voltage, and simultaneously to maintain said intermediate voltage and consequently said output voltage constant, said second means for adjusting the phase control substantially to eliminate from said error voltage such of the said residual fundamental components as are 90° and 270° out of phase with said first voltage whereby all fundamental voltage components are substantially eliminated from said error voltage.

7. Apparatus as defined in claim 6 wherein the first and second means each comprise a servo motor responsive to fundamental components in said difference harmonics voltage, said motors respectively for adjusting said voltage regulating means to effect simultaneously regulation of said intermediate and output voltages and the first of the aforesaid fundamental eliminations, and for adjusting the phase control to effect the second of the fundamental eliminations.

8. Apparatus for producing a line alternating output voltage of an ultimately desired waveform from a line input voltage of the same fundamental frequency having a different waveform, comprising first low pass filter means for filtering one of said voltages and producing a reference voltage having a waveform of substantially purely the fundamental frequency of said input voltage, means for comparing said reference voltage and a voltage having a waveform substantially the same as one of said line voltages, the difference voltage output of said comparing means representing essentially harmonics, second low-pass filter means for filtering said difference voltage so as to produce in turn an output voltage of remaining fundamental, means for further comparing said harmonics voltage and the remaining fundamental voltage to produce a harmonics voltage substantially free of all fundamental, and means for combining said last-named harmonics voltage with said input voltage thereby substantially to cancel all harmonics from said output voltage and to produce an output voltage of the desired waveform.

9. Apparatus for producing a line alternating voltage of an ultimately desired waveform from a line input voltage of the same fundamental frequency having a different waveform, comprising means for producing a reference voltage having a waveform of substantially purely fundamental frequency of said line input voltage, means for comparing said reference voltage and a voltage having a waveform substantially the same as the output line voltage, the output of said comparing means representing a difference harmonics voltage, means for eliminating from said harmonic difference voltage residual fundamental voltage components to produce a pure harmonic difference voltage, high-gain amplifying means for amplifying said pure harmonics difference voltage, and means for combining said amplified voltage and said input voltage thereby substantially to cancel all harmonics in said output voltage and to provide for the resulting output voltage said ultimately desired waveform.

References Cited in the file of this patent

UNITED STATES PATENTS

| | | |
|---|---|---|
| 1,773,772 | Berthold | Aug. 26, 1930 |
| 2,682,031 | Pocock | June 22, 1954 |
| 2,711,516 | Fredendall | June 21, 1955 |
| 2,760,011 | Berry | Aug. 21, 1956 |